United States Patent [19]

Kohler

[11] Patent Number: 4,607,601
[45] Date of Patent: Aug. 26, 1986

[54] DETACHABLE TIMING GEAR CASSETTE UNIT FOR AN EXPLOSION OR INTERNAL COMBUSTION ENGINE

[75] Inventor: Bernard Kohler, La Celle St-Cloud, France

[73] Assignee: Compagnie des Transmissions Mechaniques Sedis, France

[21] Appl. No.: 704,194

[22] Filed: Feb. 22, 1985

Related U.S. Application Data

[63] Continuation-in-part of Ser. No. 582,739, Feb. 23, 1984, abandoned.

[51] Int. Cl.$^4$ ............................................. F01L 1/02
[52] U.S. Cl. ............................ 123/90.31; 123/195 C; 123/196 R
[58] Field of Search ............ 123/90.15, 90.31, 195 C, 123/195 R, 198 E, 196 R, 198 C

[56] References Cited

U.S. PATENT DOCUMENTS

| | | | |
|---|---|---|---|
| 3,388,614 | 6/1968 | De Castelet | 123/90.31 |
| 4,054,108 | 10/1977 | Gill | 123/198 C |
| 4,122,818 | 10/1978 | Hattori | 123/196 AB |
| 4,257,370 | 3/1981 | Kasting | 123/198 E |
| 4,305,352 | 12/1981 | Oshima et al. | 123/90.31 |
| 4,395,980 | 8/1983 | Tominaga et al. | 123/90.31 |
| 4,480,609 | 11/1984 | Hayashi | 123/195 C |

*Primary Examiner*—Craig R. Feinberg
*Assistant Examiner*—David A. Okonsky
*Attorney, Agent, or Firm*—Remy J. VanOphem

[57] ABSTRACT

A detachable timing gear cassette unit for an internal combustion engine. The cassette has side walls separate from the cylinder block of the engine, and the side walls form a housing. The housing contains the camshaft sprocket, the crankshaft sprocket, a timing chain that connects the sprockets, a tensioner to maintain a suitable tension in the timing chain and positioning ribs to position the sprockets within the housing. Engine oil is circulated through the housing, in a generally downwardly direction, to lubricate the sprockets and the chain and to cool the oil. The cooling of the oil is assisted by internal ribs on the inside of the housing and by external ribs on the outside of the housing.

14 Claims, 3 Drawing Figures

DETACHABLE TIMING GEAR CASSETTE UNIT FOR AN EXPLOSION OR INTERNAL COMBUSTION ENGINE

CROSS REFERENCE TO RELATED APPLICATION

This application is a continuation-in-part of my copending application Ser. No. 582,739, filed Feb. 23, 1984 and now abandoned.

BACKGROUND OF THE INVENTION

1. Field of the Invention

The present invention relates to a detachable timing gear cassette unit, in particular of the chain type, which is in the form of an independent assembly mounted on one of the end surfaces of the engine for insuring synchronization between the crankshaft and the camshaft.

2. Description of the Prior Art

The driving of the camshaft in synchronism with the crankshaft is presently accomplished in any one of three main ways, namely by means of gears, a chain, or a notched belt.

Historically, the camshaft was driven by gear pinions, subsequently by a timing gear chain mounted between a sprocket rigidly attached to the crankshaft and a sprocket rigidly attached to the camshaft, in the case of an overhead camshaft engine. The timing gear chain travels between the two sprockets in cavities provided in the front of the crankcase, the cylinder block, and the cylinder head, which are the three major assemblies of the engine. The timing gear chain is lubricated by engine oil contained in the crankcase and it is, therefore, necessary to insure appropriate oil seals between the various surfaces of the crankcase, the cylinder block, and the cylinder head in the region of the front cavity in which the chain travels.

To insure an appropriate oil seal in the vertical plane parallel to the end surfaces of the engine, taking into account the machining tolerances of the three aforementioned assemblies, a re-machining of the front end surface of the cylinder head, the cylinder block and the crankcase is sometimes required. Naturally, re-machining is a costly phase in the mass production of the engine.

In order to overcome the complicated design of the cavity for the chain in the cylinder block, the cylinder head and the crankcase, and in particular to solve the costly sealing problems, it has been proposed to drive the camshaft by means of a drive system external to the engine. This type of system consists of a notched belt made from a reinforced elastomer. The notched belt has projections which cooperate with sprockets provided with corresponding cavities. The sprockets are rigidly attached to the end of the camshaft and the end of the crankshaft so that these two shafts are driven in synchronism.

This system is completely outside the engine and, consequently, is exposed to the exterior environment. In particular, the system is exposed to grease or oils present around an engine and to dust, insects, and water encountered as the vehicle travels. Consequently, clogging of the cavities of the sprockets on which the notched belt is engaged occurs. The cavities may, consequently, be partly filled with those external environmental substances resulting in the belt escaping from these cavities in the pulleys and in a consequential defect in the setting of the timing gear. The belt may even break when snow or ice is trapped between the belt projections and the cavities due to an increase in the pitch diameter.

Initial attempts have been made to overcome this difficulty by isolating the notched belt and its sprockets in a protective housing. This solution created further difficulties due to the normal heating of the system in the course of its operation which resulted in temperatures unsuitable for the proper operation of the belt of elastomeric material.

Further, although the timing gear system using a notched belt has differences in noise of operation as compared to a transmission by chains, it must be noted that these notched belts have a certain fragility and a much shorter effective life than conventional chains. Moreover, in order to withstand the reaction torques produced in the camshaft, sufficient structure must be given to the notched belts and to the corresponding sprockets with which they cooperate so as to take into account the power of the engine. This additional structure, of course, increases the weight and overall size of the timing gear assembly.

SUMMARY OF THE INVENTION

An object of the present invention is to provide a timing gear unit which is in the form of a compact housing providing for a preestablished setting of the timing gear, and which has a long life and is detachably mounted to and removable from the engine without modifying the setting of the timing gear of the engine.

The invention, therefore, provides a detachable timing gear cassette unit for an internal combustion or explosion engine, which includes a housing, in which are disposed means for producing, from an input movement controlled by the crankshaft, one or more output movements in synchronism with the input movement.

The primary object of the present invention is to provide a timing gear cassette unit of the chain type in which the advantages of the chain drive, i.e. its life and its capability of transmitting high torques, may be retained while eliminating the problems relating both to the design of the chain cavities and to the sealing of these cavities and at the same time provide a savings in the overall size and weight of the unit relative to an arrangement in which the chain is mounted within the cylinder block.

The invention, therefore, provides a detachable timing gear cassette unit of the chain type, consisting of a housing which is sealed from exterior unwanted environmental elements, such as dust, water, oil, seeds, and insects, and in which are disposed at least one crankshaft sprocket wheel, a camshaft sprocket wheel, and a timing chain which is engaged on the sprocket wheels and is held under tension by a suitable tensioner which insures a pre-established setting of the timing of the engine.

According to another embodiment of the present invention, the housing may include another sprocket wheel engaged with the timing chain and adapted to drive a shaft which operates in synchronism with the timing, to provide an input drive to an injection pump.

The timing gear cassette unit according to the present invention is formed by a unit mounted on one of the sides of the engine, providing a seal in the region of the passages of the shafts independent of the differences in the respective tolerances in the surface machining of the cylinder head, the cylinder block, and the crankcase.

This timing gear cassette unit contains a crankshaft sprocket wheel and a camshaft sprocket wheel. These sprocket wheels are pre-adjusted, and this pre-adjustment avoids an adjustment which is usually accomplished on the assembly line. This constitutes a considerable advantage.

According to a further object of the present invention, the sprocket wheels, engaging the timing chain placed in the housing, are freely mounted and maintained in position by positioning means.

These positioning means may be, for example, ribs in the shape of an arc of a circle defining a cavity for each respective sprocket wheel.

The timing gear unit may include, before it is mounted on the engine, a detachable angular positioning means consisting of a gage, for example of plastic material, for immobilizing the respective sprocket wheels in a given angular position.

The invention will be described hereinafter in more detail with reference to the accompanying drawings which illustrate one embodiment.

DETAILED DESCRIPTION OF THE PREFERRED EMBODIMENT

Figure 1:
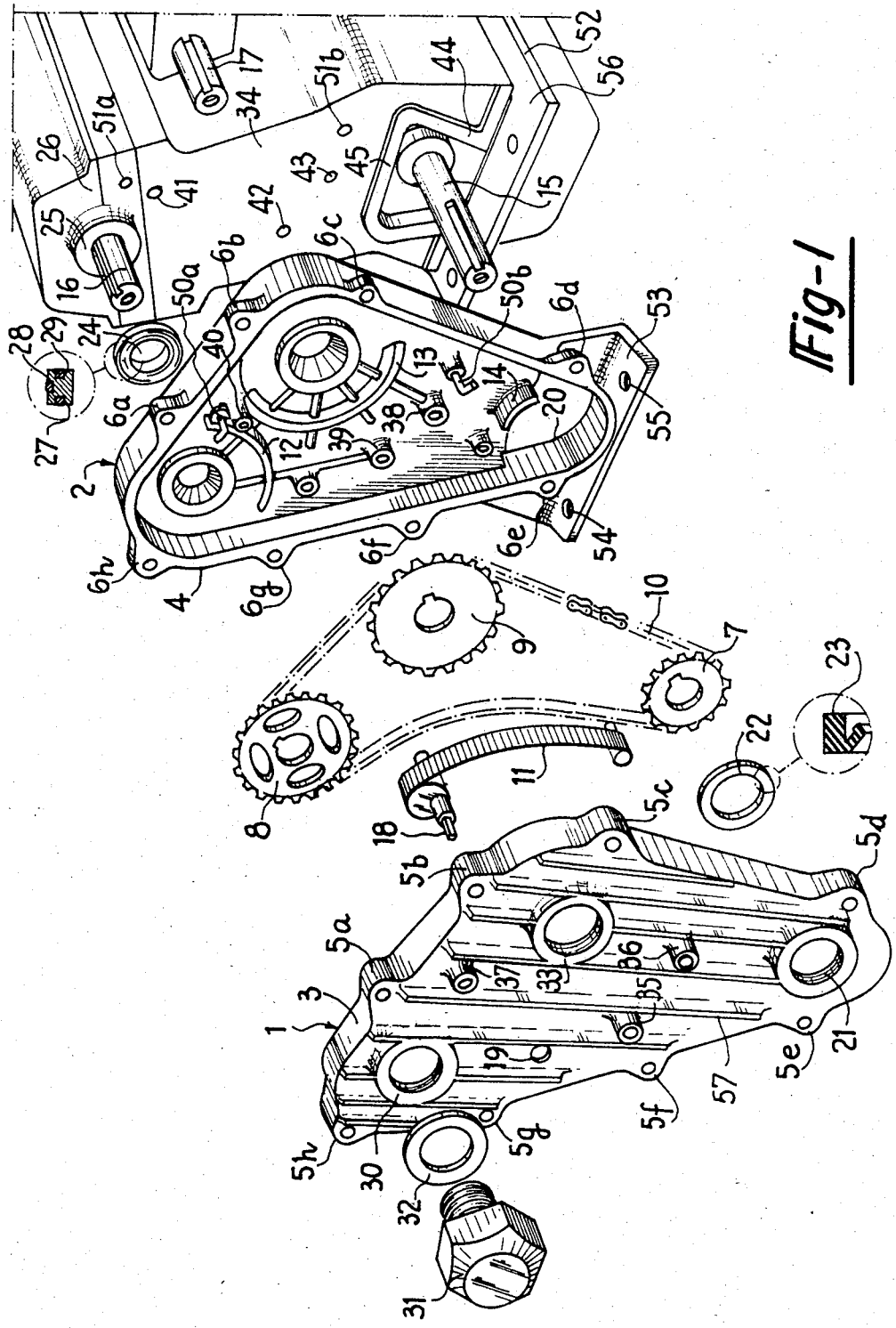
FIG. 1 is an exploded perspective view of the detachable timing gear unit of the timing chain type according to the present invention.
Figure 2:
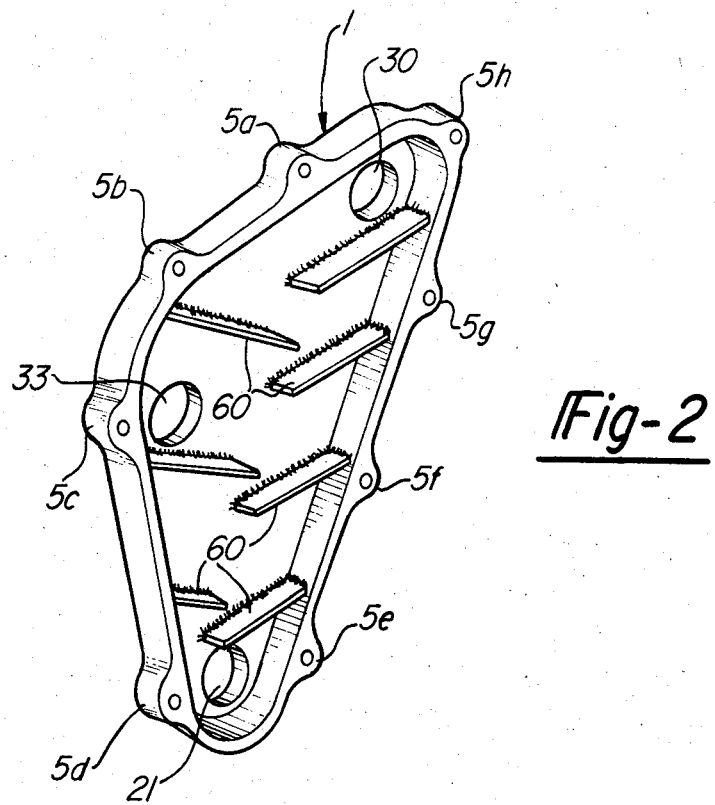
FIG. 2 is a perspective view showing the inside of an element of the timing gear unit of FIG. 1.
Figure 3:
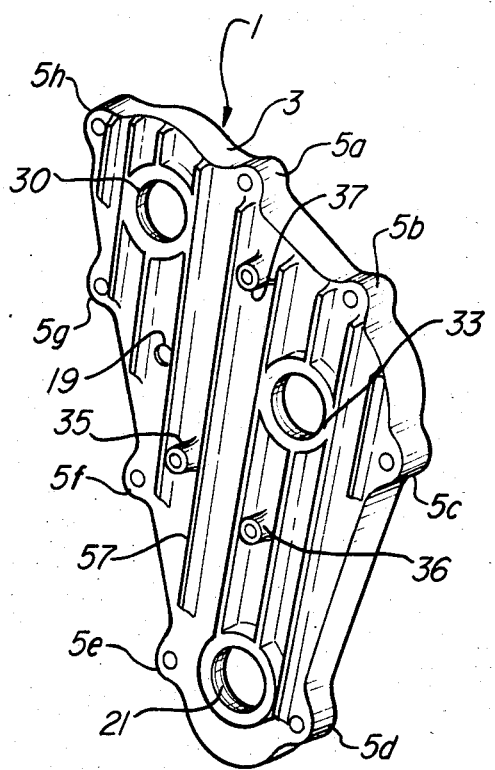
FIG. 3 is a perspective view showing the outside of the element shown in FIG. 2.

As illustrated in the FIGS. 1, 2, and 3, the detachable housing, according to the present invention includes two side walls 1 and 2 having at their peripheral flanges 3 and 4 several bosses 5a–h and 6a–h, respectively, provided with tapped apertures for assembling the two side walls in a sealing manner. In the assembled housing, obtained after assembly of the side walls 1 and 2, there is disposed a crankshaft sprocket wheel 7, a camshaft sprocket wheel 8, and a sprocket wheel 9 for driving another element of the engine, such as an injection pump. The sprocket wheels 7, 8, and 9 are interconnected by a timing chain 10 whose slack portion is put under tension by a tensioner 11. The sprocket wheels 7, 8, and 9 are positioned in the housing by ribs 12, 13, and 14, each of which is in the shape of an arc of a circle. The ribs 12, 13, and 14 are formed on the inner sides of the side walls 1 and 2 and match the contour of the sprocket wheels. The ribs 12, 13, and 14 serve to maintain the sprocket wheels in position before the housing is mounted on the engine.

Indeed, the sprocket wheels 7, 8, and 9 are directly mounted by keying respectively on the output end portions of a crankshaft 15, a camshaft 16, and an injection pump shaft 17.

The chain tensioner 11 is of the strip type and has a control device 18 which extends through an orifice 19 formed in the side wall 1 so as to put the chain under tension only after the housing has been mounted on the various shafts 15, 16, and 17.

The end portion of the crankshaft 15 extends through an aperture 20 in the side wall 2, the crankshaft sprocket wheel 7 to which it is keyed, and an aperture 21 formed in the side wall 1 and, according to the present invention, it projects from the other side of the housing and may receive driving pulleys (not shown) for transmission of power to other accessories of the engine. A seal in the region of the aperture 21 is provided by a sealing element 22 whose cross-sectional shape, for example, includes a lip portion as shown at 23, or by any other known sealing element.

A seal is provided in the region of the output end portion of the camshaft 16 by a ring 24 disposed in a corresponding aperture 25 formed in the assembly 26 comprising the cylinder head and cylinder head cover. This ring 24, whose cross-sectional shape is shown in detail, is adapted to take up the machining tolerances in the distance between the axes of the crankshaft and camshaft. the ring 24 has three circumferential grooves 27, 28 and 29 formed in each of three sides which are not in contact with the camshaft 16. Each of the circumferential grooves 27, 28 and 29 is adapted to receive an O-ring sealing element which itself provides the seal. This ring 24 does not only take up the tolerances concerning the distance between the axis of the crankshaft and the axis of the camshaft, but also insures the sealing of the offsets between the confronting surfaces of the cylinder head and cylinder block.

Alternatively, the free communication of the engine oil between the cylinder head and the cassette unit and crankcase, and the sealing of this connection with respect to the outside of these two parts, at the level of the output end of the camshaft 16, may be obtained by replacing the ring seal 24, as shown in the preferred embodiment, by a lip seal, similar to lip seal 23, mounted in the aperture 25 of the assembly 26. Any other known sealing system may be adopted.

The end portion of the camshaft 16 is keyed to the camshaft sprocket wheel 8 which is held fast to the end portion of the camshaft by a screw (not shown) accessible through a tapped orifice 30 formed in the side wall 1 and closed by a plug 31 and a sealing element 32.

The side wall 1 also has a tapped orifice 33 which is closed by a plug (not shown) and allows access to the end of the injection pumpshaft 17 of the injection pump so as to key and hold fast the sprocket wheel to this shaft.

The housing formed by the assembled side walls 1 and 2 is secured to the planar front end side of a cylinder block 34 by screws, not shown, which extend through bored reinforcing bosses 35, 36, and 37 of the side wall 1 and spacer portions 38, 39, and 40 of the side wall 2 and which are screwed in corresponding tapped apertures 41, 42, and 43 formed in the cylinder block.

A seal is provided between the aperture 20 and a notch 44 formed in the cylinder block by a flat sealing element (not shown) on a machined bearing surface 45.

The timing chain 10 of the timing gear cassette unit is lubricated by the engine oil coming from the cylinder head. The engine oil communicates with the inside of the cassette unit at the outlet of the camshaft 16 through the side wall 2 by means of one or more pipes 50a, 50b which communicate with the lubrication circuit 51a and 51b of the engine. The pipes 50a and 50b may be directed in such a manner as to project oil directly onto the timing chain 10 which then acts as a moving ramp or slide for conveying and permitting the flow of the oil to the lower part of the housing which communicates with the crankcase or sump 52 through the aperture 20. The flowing and projection of the engine oil inside the timing gear cassette unit serves to cool the oil, with the flow of oil along the inside of the timing gear cassette unit, and its cooling, being assisted by the presence of ribs 60 on the inside surface of the side wall 1, as is shown in FIG. 2. The ribs 60 are arranged in a staggered pattern in order to define a long flow path for the oil flowing therealong by gravity. External ribs 57 on the outside surface of the side wall 1, as shown in FIG. 3, are exposed to outside air, and will also assist in the cooling of the oil.

In the illustrated embodiment, the side wall 2 has in its lower part a tab 53 provided with apertures 54 and 55 for the passage of screws for securing it to a flange 56 of the crankcase 52.

The detachable timing gear cassette unit of the chain type according to the present invention is, prior to attachment to the engine, mounted on a gage which permits pre-setting of the timing while the chain tensioner 11 is maintained in a stressed condition so as to exert no tensioning action on the chain.

This gage acts as a detachable angular positioning means and may be formed, for example, from a substantially planar structure of plastic material from which extend cylindrical studs having a groove thereon. These studs cooperate with the sprocket wheels and their respective key slots so as to set the angular positions of the sprocket wheels with respect to each other.

The gage has not been shown in the drawing since it is only a temporary means whose operation is essentially related to the assembly procedure.

When the timing gear cassette unit, according to the invention, must be assembled with the engine on the automobile assembly lines, the unit is positioned with its gage in position on the end portions of the crankshaft, camshaft, and injection pumpshaft which have been previously oriented with respect to each other. The gage is then removed and the sprocket wheels 7, 8, and 9 are held fast to the corresponding shafts. The plugs are then mounted to close the orifices 30 and 33 to seal them and alternatively the aperture 21 or the pulleys which must be fixed on the end of the crankshaft 15 are placed in position. The timing chain 10 is then placed under tension by the tensioner 11 by the control means 18.

The use of such a detachable timing gear cassette unit, which permits a pre-setting of the timing, avoids another adjustment on the assembly line. Further, in view of the fact that the timing gear cassette unit is oil-sealed and mounted on the end side of the cylinder block, there is no need to machine the vertical joint planes between the cylinder block, the cylinder head, and the crankcase, which is a significant savings as concerns the convenience, cost, and rapidity of the manufacture of the engine.

The timing gear cassette unit is sealed against any exterior agent, in particular dust or water, and is lubricated by the oil of the engine. Moreover, the timing gear cassette unit performs the function of a return in the lubricating oil circulation and of the regulation (i.e. cooling) of the temperature of the oil at an optimum value.

Indeed, the oil delivered to the upper part of the lubrication circuit may be sent directly to the chain which then acts as a conveyor and a ramp or slide for a rapid return of the oil to the lower crankcase or sump, which is of considerable advantage in the case of high running speeds of the engine when the upper parts of the engine are excessively lubricated, bearing in mind the imposed redescending flow of the oil under the effect of gravity in the circuit returning the oil to the sump and the pump.

This detachable timing gear housing also permits the chain and its sprocket wheels to be changed without modifying the setting of the timing because another housing can be substituted therefor.

There is, moreover, observed a gain in the overall size relative to notched belts and to arrangements of the type having a timing chain which is integrated in the cylinder block, and also a gain in weight relative to the notched belt. Indeed, it is possible to reduce substantially, by a value which may be as much as 30% or more, the weight of the moving parts relative to the arrangement employing a notched belt.

It is well known that chains have a much longer life than notched belts and that the maintenance of the setting characteristics is a function of the duration of the effective operation of the timing chain while the belt may be suddenly destroyed without any warning and with consequences which could result in a seizure of the engine-propelling unit at full speed.

The detachable housing for the timing gear of the chain type according to the present invention may be produced by casting it in a light alloy or any other material which resists oil at the operating temperatures encountered. The housing may be made in two parts and assembled by screws or it may be arranged to seal the housing by means which cannot be disassembled so as to lighten the assembly.

What is claimed is:

1. A detachable timing gear cassette unit for attaching to a crankshaft and a camshaft of a cylinder block of an engine, said timing gear cassette unit comprising:
    a housing formed by at least two sealingly interconnected side walls, said housing, including said at least two interconnected side walls, being attachable and detachable as a unit from said cylinder block; and
    synchronization means disposed within said housing, said synchronization means comprising:
        first means for producing an input movement for connection to said crankshaft;
        at least one second means for producing an output movement for connection to said camshaft;
        third means interconnecting said first and at least one second means, said first, at least one second, and third means being prepositioned and communicating such that said third means drivingly connects said first means to said at least one second means whereby said output movement is driven in synchronism with said input movement; and
        positioning means located adjacent said first and at least one second means for maintaining said first means and said at least one second means in position during attachment of said timing gear cassette unit to said cylinder block.

2. The timing gear cassette unit according to claim 1, wherein said first means is a crankshaft sprocket wheel, said at least one second means is a camshaft sprocket wheel and said third means is a chain which engages said sprocket wheels, and wherein said timing gear cassette unit further comprises means for sealing said housing and means for putting said chain under tension.

3. The timing gear cassette unit according to claim 2, comprising at least one additional sprocket wheel engaged with said chain for producing an additional output movement for connection to an injection pumpshaft whereby said injection pumpshaft is driven in synchronism with said camshaft and crankshaft.

4. The timing gear cassette unit according to claim 2, wherein said positioning means comprises a plurality of ribs, each of which is in the shape of an arc of a circle, each of said ribs matching the contour of one of said sprockets wheels and serving to position said one of said sprocket wheels.

5. The timing gear cassette unit according to claim 2, further comprising means for lubricating said chain and for connection to the lubrication circuit of said engine.

6. The timing gear cassette unit according to claim 5, wherein one of said at least two sealingly interconnected side walls comprises ribs on the inside thereof and wherein said means for lubricating said chain and for connection to the lubrication circuit of said engine causes engine oil to flow along said ribs to assist in the cooling of said engine oil.

7. The timing gear cassette unit according to claim 6, further comprising external ribs on the outside of one of said at least two interconnected side walls, said external ribs being exposed to outside air and further serving to cool said engine oil by heat transfer to said outside air.

8. An engine comprising a cylinder block and a timing gear cassette unit for attachment to and detachment from said cylinder block, said timing gear cassette unit comprising:
   a plurality of sealingly interconnected side walls forming a housing, said plurality of side walls being attachable and detachable in unison from said cylinder block;
   drive means disposed within said housing, said drive means comprising first drive means for producing an input movement for connection to a crankshaft, second drive means for producing an output movement and third drive means drivingly connecting said first drive means and said second drive means to drive said second drive means in synchronism with said first drive means; and
   positioning means located adjacent said first and second drive means for maintaining said first and second drive means in position during attachment of said timing gear cassette unit to said cylinder block.

9. The engine according to claim 8, wherein said engine comprises a crankshaft and a camshaft, said crankshaft and said camshaft extending from said cylinder block into said housing, said first drive means comprising a crankshaft sprocket wheel attached to said crankshaft and disposed within said housing, said second drive means comprising a camshaft sprocket wheel attached to said camshaft and disposed within said housing, said third drive means comprising a timing chain for connecting said crankshaft sprocket wheel and said crankshaft sprocket wheel to synchronize the driving of said crankshaft and said camshaft, said timing gear cassette unit further comprising:
   sealing means for sealing said housing; and
   tensioning means for putting said timing chain under tension.

10. The engine according to claim 9, further comprising:
   an injection pumpshaft mounted to said cylinder block and extending into said housing; and
   an injection pumpshaft sprocket wheel attached to said injection pumpshaft and disposed within said housing, said timing chain connecting said crankshaft sprocket wheel, said camshaft sprocket wheel, and said injection pumpshaft sprocket wheel to synchronize the driving of said crankshaft, said camshaft, and said injection pumpshaft.

11. The engine according to claim 9, wherein said positioning means comprises a plurality of ribs each of which is in the shape of an arc of a circle, each of said ribs matching the contour of one of said sprocket wheels and serving to position said one of said sprocket wheels.

12. The engine according to claim 9, further comprising:
   lubricating means for circulating engine oil from said cylinder block into said housing and back to said cylinder block for lubricating said timing chain.

13. The engine according to claim 12, wherein at least one of said plurality of sealingly interconnected side walls of said timing gear cassette unit comprises ribs on the inside thereof and wherein said means for lubricating said timing chain and for connection to said lubrication circuit of said engine causes engine oil to flow along said ribs to assist in the cooling of said engine oil.

14. The engine according to claim 13, further comprising external ribs on the outside of one of said plurality of interconnected side walls, said external ribs being exposed to outside air and further serving to cool said engine oil by heat transfer to said outside air.

* * * * *

UNITED STATES PATENT AND TRADEMARK OFFICE
CERTIFICATE OF CORRECTION

PATENT NO. : 4,607,601
DATED : August 26, 1986
INVENTOR(S) : Bernard Kohler

It is certified that error appears in the above-identified patent and that said Letters Patent is hereby corrected as shown below:

Column 2, line 27, delete "preestablished" and insert ---- pre-established ----.

In the Claims

Column 6, line 29, delete "attaching" and insert ---- attachment ----.

Column 7, line 5, delete "sprockets" and insert ---- sprocket ----.

Signed and Sealed this

Seventeenth Day of March, 1987

Attest:

DONALD J. QUIGG

Attesting Officer

Commissioner of Patents and Trademarks